United States Patent
Chen et al.

(10) Patent No.: US 7,579,874 B2
(45) Date of Patent: Aug. 25, 2009

(54) LOW VOLTAGE DIFFERENTIAL SIGNALING TRANSMITTER AND TRANSMITTING METHOD

(75) Inventors: Chien-Chung Chen, Pingtung County (TW); Chien-Cheng Tu, Hsinchu (TW); Po-Ju Lee, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 12/032,700

(22) Filed: Feb. 18, 2008

(65) Prior Publication Data

US 2009/0116564 A1    May 7, 2009

(30) Foreign Application Priority Data

Nov. 1, 2007    (TW) .............................. 96141202 A

(51) Int. Cl.
*H03K 17/16* (2006.01)
(52) U.S. Cl. .............................. 326/83; 326/26; 326/87
(58) Field of Classification Search .................. 326/26, 326/27, 83–87
See application file for complete search history.

(56) References Cited

U.S. PATENT DOCUMENTS

| | | | |
|---|---|---|---|
| 6,281,715 B1 | 8/2001 | DeClue et al. | |
| 6,288,581 B1 * | 9/2001 | Wong | 327/108 |
| 6,437,599 B1 * | 8/2002 | Groen | 326/63 |
| 6,590,432 B1 * | 7/2003 | Wu et al. | 327/108 |
| 6,977,534 B2 * | 12/2005 | Radelinow | 327/112 |

* cited by examiner

*Primary Examiner*—Don P Le
(74) *Attorney, Agent, or Firm*—Jianq Chyun IP Office

(57) ABSTRACT

A low voltage differential signaling (LVDS) transmitter receives a data signal, a data invert signal and a plurality of logic signals. The LVDS transmitter includes a first-stage differential signaling transmitting circuit and a second-stage differential signaling transmitting circuit. The first-stage differential signaling transmitting circuit receives the data signal and the data invert signal and has a first output terminal and a second output terminal. The second-stage differential signaling transmitting circuit is controlled by the logic signals, and has a third output terminal and a fourth output terminal respectively connected to the first output terminal and the second output terminal, so as to generate a needed pre-emphasis signal. When no pre-emphasis signal needs to be generated, the second-stage differential signaling transmitting circuit is controlled to be in disabled state.

17 Claims, 7 Drawing Sheets

LOW VOLTAGE DIFFERENTIAL SIGNALING TRANSMITTER AND TRANSMITTING METHOD

CROSS-REFERENCE TO RELATED APPLICATION

This application claims the priority benefit of Taiwan application serial no. 96141202, filed on Nov. 1, 2007. The entirety of the above-mentioned patent application is hereby incorporated by reference herein and made a part of this specification.

BACKGROUND OF THE INVENTION

1. Field of the Invention

The present invention relates to a low voltage differential signaling (LVDS) transmitter and, more specifically, relates to a LVDS transmitter with pre-emphasis function.

2. Description of Related Art

Digital signal data is usually transmitted in binary data signal, which has two voltage levels, representing data 0 or 1. In terms of signal waveform, high level and low level changing signals are used to transmit 0/1 data strings.

However, the circuit may have RC effect caused by resistance and capacitance, and therefore the rising side and the falling side cannot show step change and further cause data determining error. FIG. 1 schematically illustrates the phenomenon of RC delay effect. With reference to FIG. 1, in the case of a simple RC circuit 100, when an ideal pulse signal is input, the ideal pulse signal is transmitted to another terminal and output. The low level of the input pulse signal represents data 0, while the high level represents data 1. Due to RC circuit effect, the rising side and the falling side of the output pulse signal both have delay, and data determining error may be resulted. To solve this problem, the prior arts propose a pre-emphasis signal processing mechanism.

FIG. 2 schematically illustrates a diagram of a pre-emphasis mechanism of prior arts. With reference to FIG. 2, the data signal 102 has two levels, the position from low level to high level is the rising side, and the position from high level to low level is the falling side. To avoid RC delay effect, for example a pre-emphasis signal 104 is generated at the corresponding place of the rising side and the falling side. And the pre-emphasis signal 104 is added to the data signal 102, so that the speed of the rising side and the falling side is increased, therefore data determining (reading) error is avoided. As shown in FIG. 2, to generate the pre-emphasis signal 110, the data signal 106 may be delayed to obtain a data delay signal 108. And then the pre-emphasis signal 110 is generated based on the relation between the delay signal and the data signal.

A conventional signaling transmitting mechanism is described next. FIG. 3 illustrates a circuit diagram of a conventional LVDS transmitter. With reference to FIG. 3, the LVDS transmitter has two same circuit paths 120, 122 connected in parallel. The circuit path 120 comprises P transistors and N transistors which are connected in series through an output terminal. The gates of the two transistors are commonly connected to an input negative power supply VINN. The circuit path 122 also comprises P transistors and N transistors which are connected in series through an output terminal OUTN. The gates of the two transistors are commonly connected to an input positive power supply VINP. The two output terminals OUTN, OUTP are connected to two ends of a load 128. The circuit path 120 and 122 are connected between two current sources 124, 126, and are respectively driven by bias voltages BP, BN, and operate between a low voltage source $V_{DD}$ and a ground voltage. The controlling operation is performed through an inverter-type switch between two output terminals OUTN, OUTP. Current of the current source is passed out via the OUTP terminal or the OUTN terminal. At last, the desired differential voltage value is generated through the resistor load 128. Wherein, the BP and the BN, which are used to control the current value, are biases of the current source.

The traditional LVDS transmitter in FIG. 3 doesn't have pre-emphasis function. However, for example U.S. Pat. Nos. 6,288,581, 6,281,715, 6,977,534 and so on are also incorporated into the pre-emphasis circuit. Even so, the traditional LVDS transmitter still has some part to be further improved. Those in the ordinary arts still keep on researching and developing different circuit designs to enhance operation efficiency.

SUMMERY OF THE INVENTION

The present invention provides a LVDS transmitter and transmitting method thereof; in addition to the pre-emphasis function, the circuit design of the present invention at least reduces the power consumption.

The present invention provides a LVDS transmitter, receiving a data signal, a data invert signal and a plurality of logic signals. The LVDS transmitter comprises a first-stage differential signaling transmitting circuit and a second-stage differential signaling transmitting circuit. The first-stage differential signaling transmitting circuit receives the data signal and the data invert signal, and has a first output terminal and a second output terminal. The second-stage differential signaling transmitting circuit is controlled by a plurality of logic signals, and comprises a third output terminal and a fourth output terminal which are respectively coupled to the first output terminal and the second output terminal to generate a desired pre-emphasis signal. When no pre-emphasis signal needs to be generated, the second-stage differential signaling transmitting circuit is controlled to be in disabled state.

According to an embodiment of the present invention, in the LVDS transmitter, for example when there is no level change in the data signal, the second-stage differential signaling transmitting circuit controlled by a plurality of logic signals is in disabled state.

According to an embodiment, the LVDS transmitter for example further comprises a delay circuit which receives an original data signal and a clock signal, and delays the original data signal to generate the data signal and the data invert signal of the data signal. Further, after the data signal is delayed for a period of time, a delayed data signal and a delayed data invert signal of the delayed data signal are output. A pulse generator receives the data signal, the data invert signal, the delayed data signal and the delayed data invert signal, and outputs a plurality of logic signals according to a pre-set logic rule.

According to an embodiment, in the LVDS transmitter, for example the delay circuit comprises a first flip-flop and a second flip-flop. The first flip-flop receives the original data and the clock signal and outputs the data signal and the data invert signal; the second flip-flop receives the data signal and the clock signal and outputs the delayed data signal and the delayed data invert signal.

According to an embodiment, in the LVDS transmitter, for example the pulse generator comprises a first circuit and a second circuit. The first circuit receives the data signal and the delayed data signal to generate two of a plurality of the logic data signals; the second circuit receives the data invert signal and the delayed data signal to generate another two of the plurality of the logic data signals; wherein the first and second circuits have the same logic operation relation.

According to an embodiment, in the LVDS transmitter, for example the second-stage differential signaling transmitting circuit is controlled by a plurality of logic signals, so as to generate a positive pre-emphasis signal and a negative pre-emphasis signal respectively provided to a high level data signal and a low level data signal.

According to an embodiment, in the LVDS transmitter, for example the first-stage differential signaling transmitting circuit comprises a first P-type transistor, a first N-type transistor, a second P-type transistor and a second N-type transistor. The first P-type transistor and the first N-type transistor are connected in series to form a first path, and the two gates thereof are connected to receive data signal. The second P-type transistors and the second N-type transistors are connected in series to form a second path, and the two gates thereof are connected to receive the data invert signal. And the first path and the second path are connected in parallel.

According to an embodiment, in the LVDS transmitter, for example the second-stage differential signaling transmitting circuit comprises a first P-type transistor, a first N-type transistor, a second P-type transistor and a second N-type transistor. The first P-type transistor and the first N-type transistor are connected at the third output terminal in series and form a first path. The second P-type transistors and the second N-type transistors are connected at the fourth terminal in series and form a second path. The first path and the second path are connected in parallel. The four gates of the four transistors are respectively controlled by a plurality of logic signals.

According to an embodiment, in the LVDS transmitter, for example A represents the data signal, AN represents the data invert signal, B represents a delayed data signal of the data signal A, BN represents an invert signal of the delayed data signal B. A plurality of logic signals has four logic signals represented by a, b, c, d, which are respectively connected to the gates of the first P-type transistor, the first N-type transistor, the second P-type transistor and the second N-type transistor. A negative current output is represented by $-I_M$, a positive current output is represented by $I_M$, a pre-emphasis negative output is represented by $-I_M-I_N$, a pre-emphasis positive output is represented by $I_M+I_N$, a current $I_N$ is provided by the second-stage differential signaling transmitting circuit. The second-stage differential signaling transmitting circuit works with the inputs of the data signal A and the data invert signal AN to execute a logic truth table and to output as follows:

| A | B | AN | BN | a | b | c | d | OUTPUT |
|---|---|----|----|---|---|---|---|--------|
| 0 | 0 | 1  | 1  | 1 | 0 | 1 | 0 | $-I_M$ |
| 0 | 1 | 1  | 0  | 0 | 0 | 1 | 1 | $-I_M - I_N$ |
| 1 | 0 | 0  | 1  | 1 | 1 | 0 | 0 | $I_M + I_N$ |
| 1 | 1 | 0  | 0  | 1 | 0 | 1 | 0 | $I_M$  |

The present invention further provides a LVDS transmitter, used to transmit a data signal. The LVDS transmitter comprises a control signal generating circuit, a first-stage differential signaling transmitting circuit and a second-stage differential signaling transmitting circuit. The control signal generating circuit receives the data signal to check that a level of the data signal is in a no-change state; and, determines whether it is a rising state or a falling state if there is any change. There are three types of control signals are output respectively corresponding to the three states. The first-stage differential signaling transmitting circuit receives the data signal and the data inverted signal, and the first-stage differential signaling transmitting circuit comprises a first output terminal and a second output terminal. The second-stage differential signaling transmitting circuit is controlled by four logic signals, and has a third output terminal and a fourth output terminal respectively coupled to the first output terminal and the second output terminal. A desired pre-emphasis signal is correspondingly generated according to the three types of control signals. And in the no-change state, the second-stage differential signaling transmitting circuit is controlled to be in a disabled state.

According to an embodiment, in the LVDS transmitter, for example the control signal generating circuit comprises a delay circuit, which delays the data signal first, then compares with the level of a current data to determine one of the three states, so as to control the operation state of the second-stage differential signaling transmitting circuit.

According to an embodiment, in the LVDS transmitter, for example the pulse width of the pre-emphasis signal is the width of a cycle time of a clock.

The present invention also provides a LVDS transmitting method for transmitting a data signal. The signal transmitting method comprises providing a first-stage differential signaling transmitting circuit, providing a data signal; providing a second-stage differential signaling transmitting circuit, coupling to the first-stage differential signaling transmitting circuit, to generate a pre-emphasis signal for a rising side and a falling side of the data signal. In addition, the signaling transmitting method further comprises providing a control signal generating circuit, generating a plurality of control signals to control the second-stage differential signaling transmitting circuit to generate the pre-emphasis signal. And when a level of the data signal has no change, the second-stage differential signaling transmitting circuit is controlled to be in disabled state.

In order to the make the aforementioned and other objects, features and advantages of the present invention comprehensible, a preferred embodiment accompanied with figures is described in detail below.

BRIEF DESCRIPTIONS OF DRAWINGS

FIG. 1 schematically illustrates the phenomenon of RC delay effect.

FIG. 2 schematically illustrates a diagram of pre-emphasis mechanism of prior arts.

Figure 5:
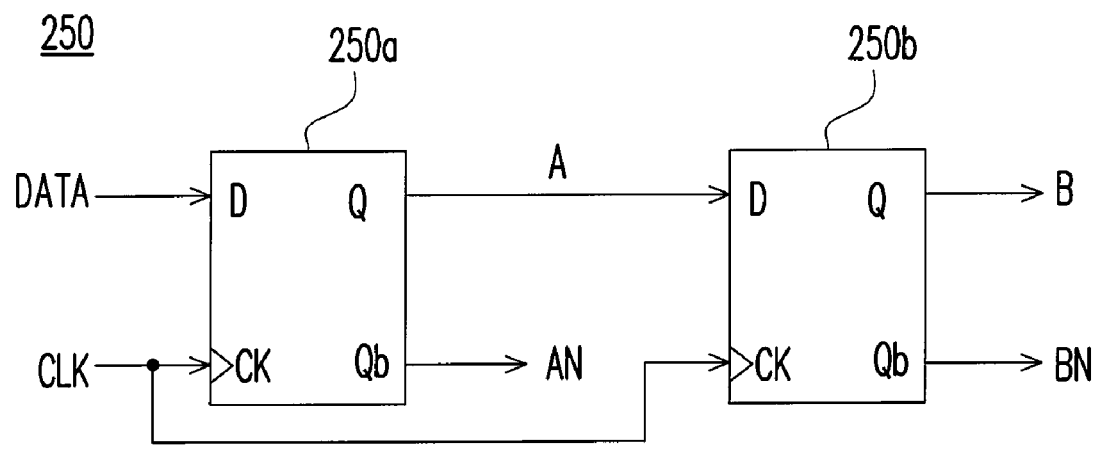

FIG. 5 schematically illustrates a diagram of a delay circuit 250 according to an embodiment of the present invention.

Figure 6:
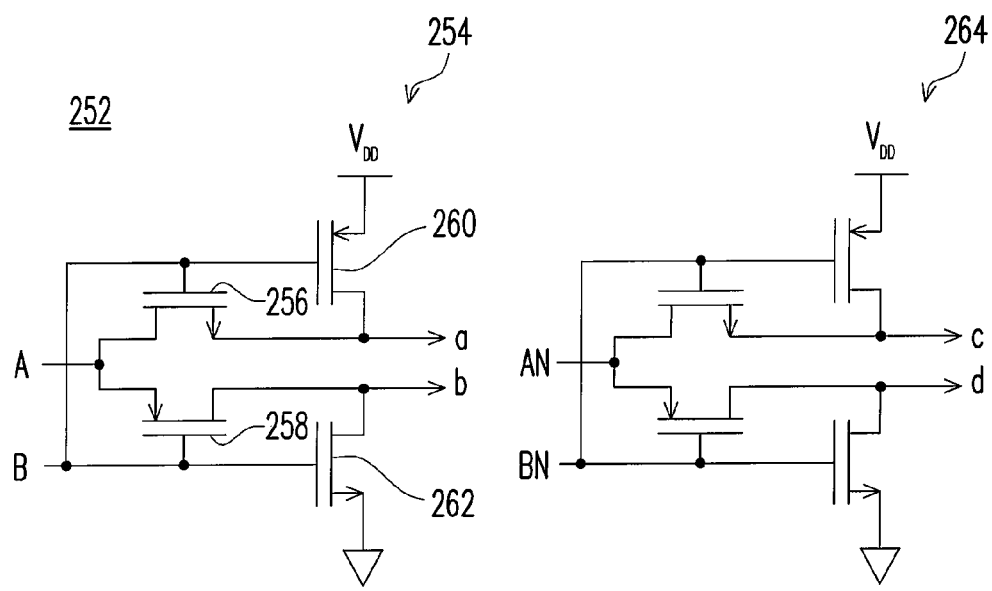

FIG. 6 schematically illustrates a circuit diagram of a pulse generator according to an embodiment of the present invention.

Figure 7:
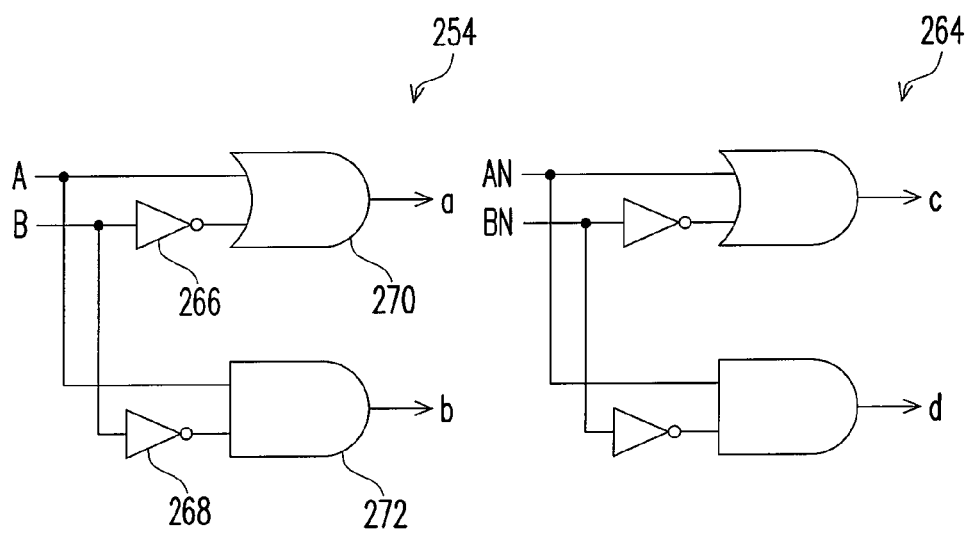

FIG. 7 schematically illustrates a circuit diagram of another pulse generator according to an embodiment of the present invention.

Figure 1:
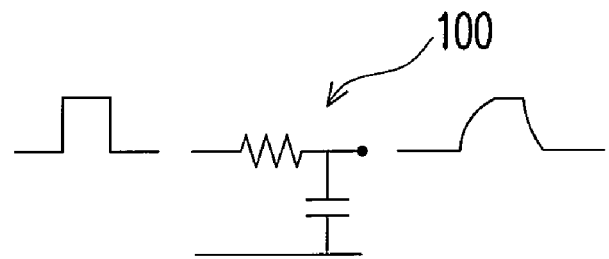
Figure 2:
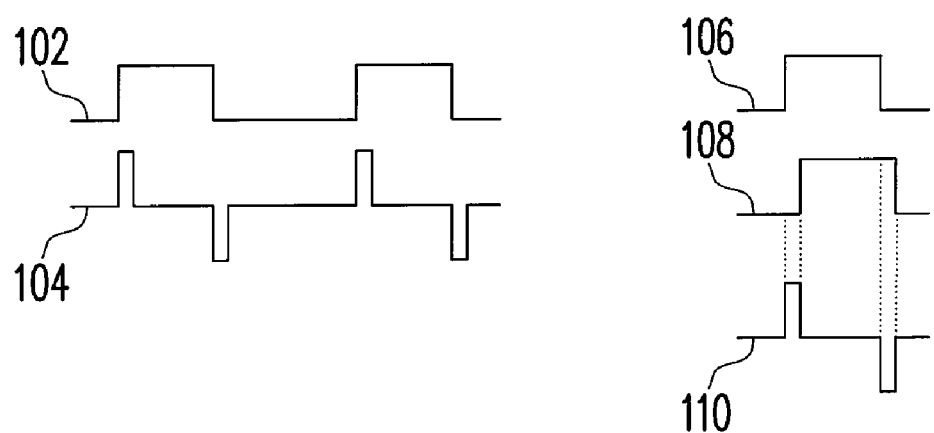
Figure 3:
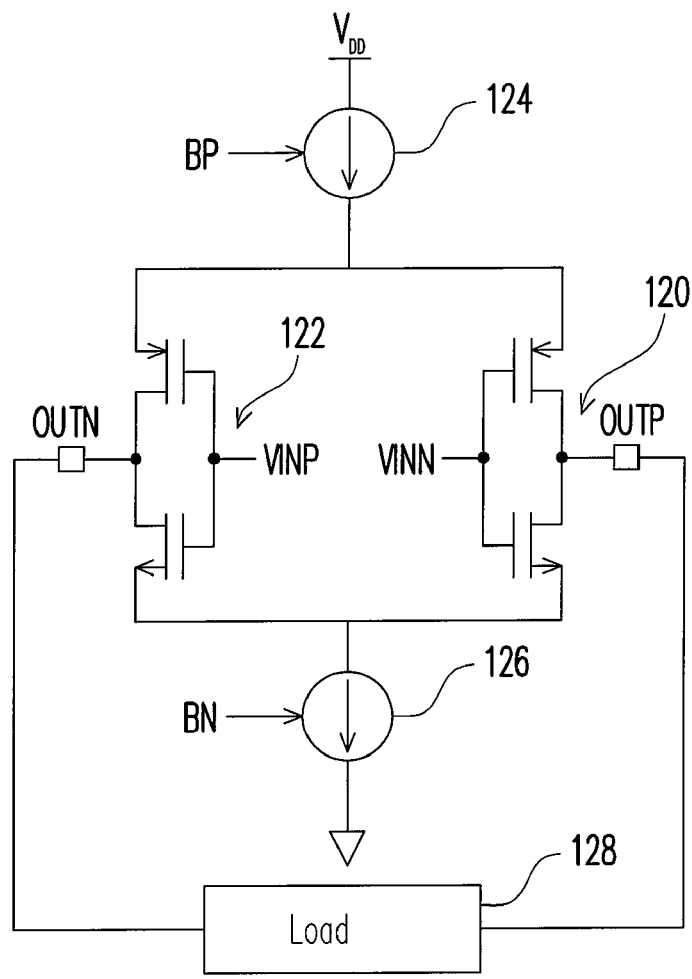
FIG. 3 illustrates a circuit diagram of a LVDS of prior arts.
Figure 4:
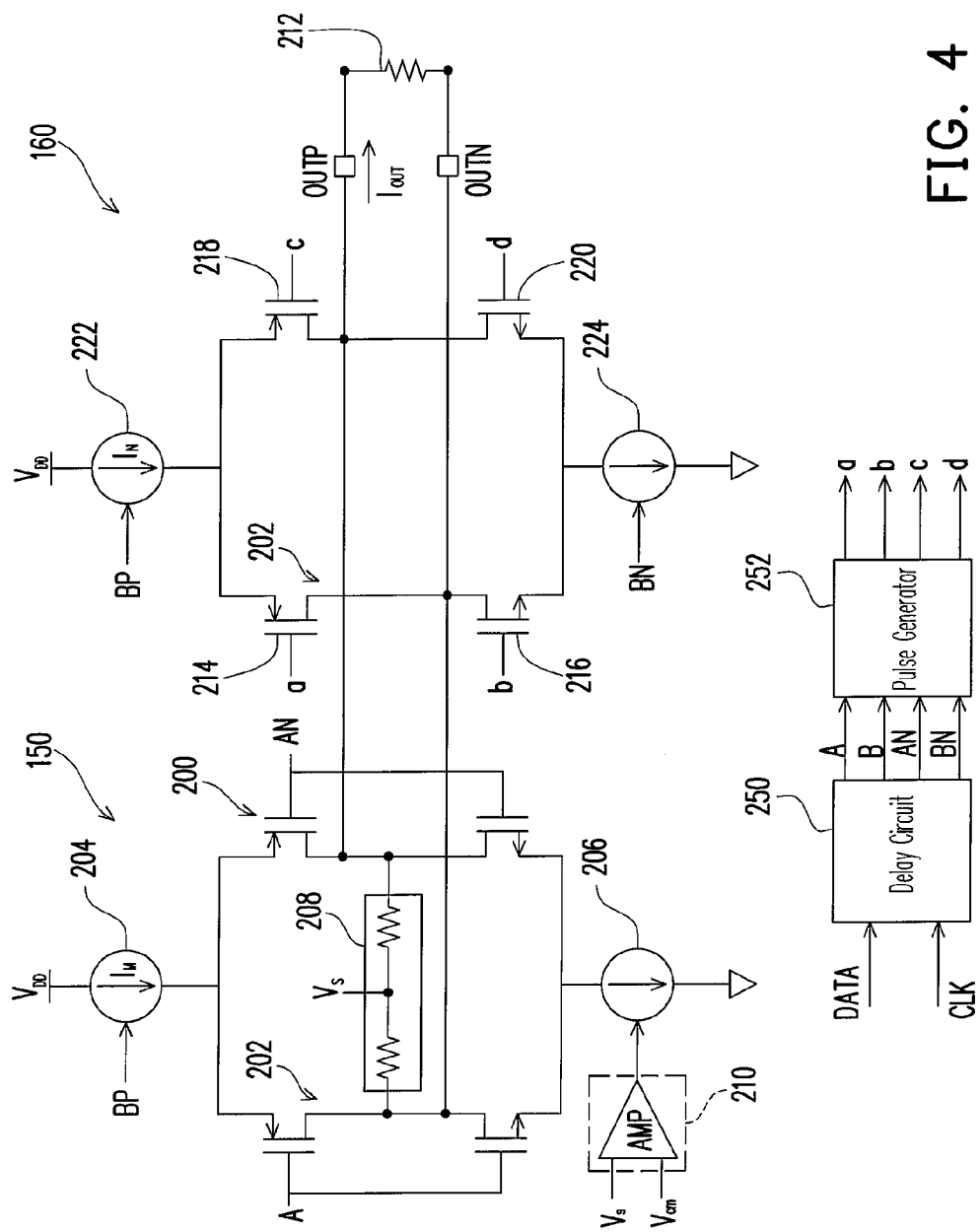
FIG. 4 illustrates a circuit diagram of a LVDS transmitter according to an embodiment of the present invention.
Figure 8:
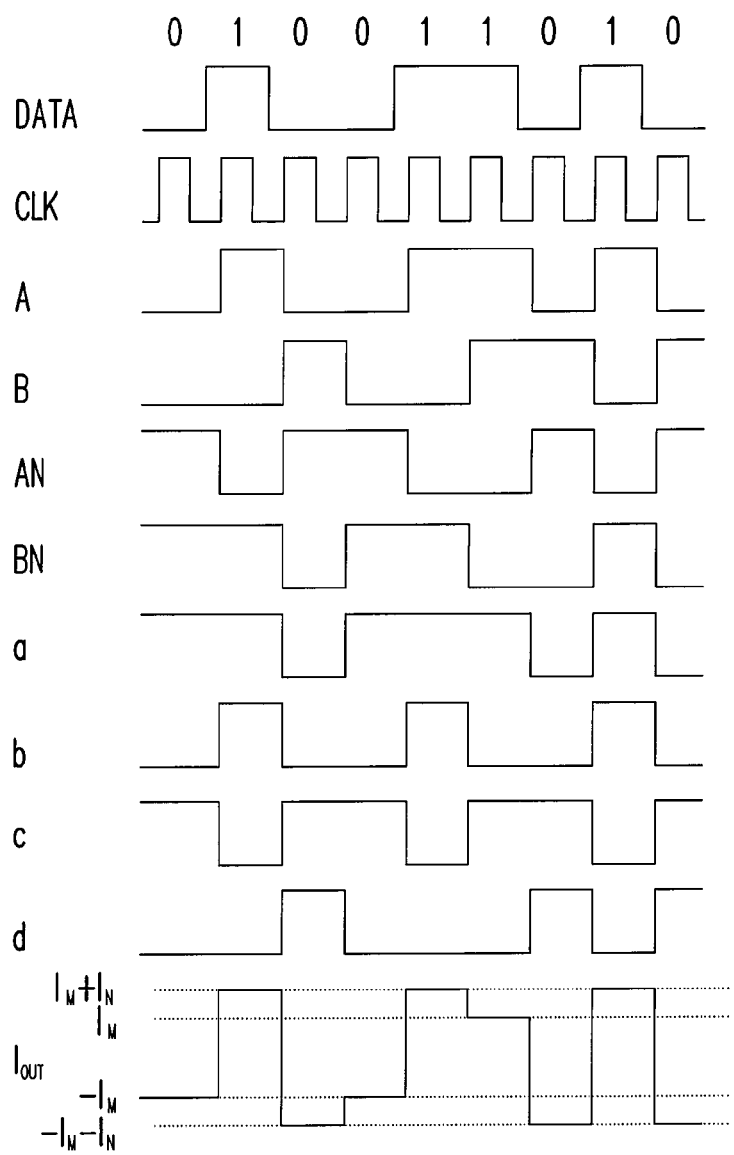

FIG. 8 schematically illustrated a signal transmitting time sequence diagram and a truth table using the circuit in FIG. 4 according to an embodiment of the present embodiment.

Figure 9:
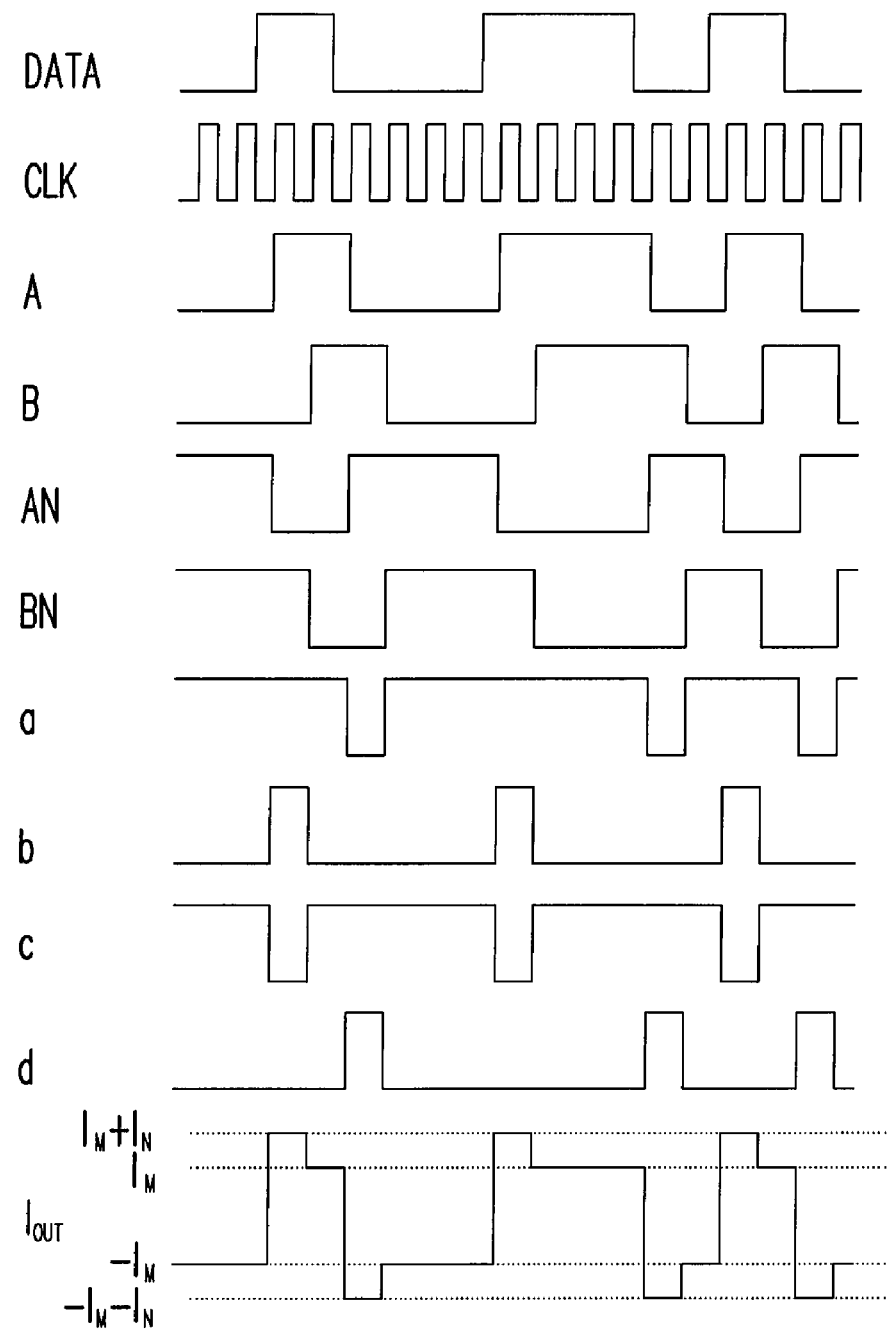

FIG. 9 schematically illustrated a signal transmitting time sequence diagram using the circuit in FIG. 4 according to another embodiment of the present embodiment.

DESCRIPTION OF EMBODIMENTS

The LVDS transmitter of the present invention is a LVDS transmitter with pre-emphasis function. In addition to a primary stage LVDS transmitting circuit, a secondary stage LVDS transmitting circuit and a control circuit thereof are added to the LVDS transmitter. When change occurs in the signal to be transmitted, in addition to the current provided by the primary stage, the output current further has an additional current, so that pre-emphasis effect is thus achieved. When there is no change occurs in the signal to be transmitted, the output current only comprises the primary stage current, and due to the transistor switch being turned off, the secondary stage current is off without wasting current, so current efficiency is increased. The following embodiments are used to describe the present invention, but the present invention is not limited to the exemplary embodiments provided herein.

In order to realize the above mechanism, for example the signal to be transmitted is converted with the flip-flop to generate the delayed signal and the invert signal thereof, and then the signals are input to the pulse generator to generate the secondary stage control signal, so as to achieve the goal of pre-emphasis without wasting current.

FIG. 4 illustrates a circuit diagram of a LVDS transmitter according to an embodiment of the present invention. The LVDS transmitter comprises a primary stage LVDS transmitting circuit 150, a second-stage LVDS transmitting circuit 160 and a control signal generating circuit 250+252.

With reference to FIG. 4, the primary stage LVDS transmitting circuit 150 for example comprises symmetric circuit paths 200 and 202. The circuit path 200 is connected in series through a P-type transistor and an N-type transistor, and the connecting point is used as an output terminal OUTP. The gates of the two transistors are connected together to receive a data signal AN. The circuit path 202 is also connected in series through a P-type transistor and an N-type transistor, and the connecting point is used as another output terminal OUTN. The gates of the two transistors are connected together to receive a data signal A. The invert data signal AN is an inverted signal of the data signal A. The circuit path 200 and the circuit path 202 connected in parallel to form a current steering circuit, and are connected between two current sources 204 and 206. The current source 204 is driven by a BP signal to generate the current $I_M$, which corresponds to the level of the data signal. A common mode voltage sense module 208 is connected between two output terminals OUTP, OUTN to generate a common mode error voltage Vs. The common mode error voltage Vs and a reference voltage Vcm generate a driving signal for the current source 206 through a common mode voltage error amplifier 210.

The data signal A and the invert data signal AN, and other needed control signals for example are generated through the control signal generating circuit 250+252, more details thereof is described later.

The secondary stage LVDS transmitting circuit 160 and the primary stage LVDS transmitting circuit 150 of the present invention have a pre-emphasis effect to the data signal. A basic circuit of the secondary stage LVDS transmitting circuit 160 is roughly the same as the primary stage LVDS transmitting circuit 150, but the control methods are different. The secondary stage LVDS transmitting circuit 160 for example comprises a two symmetric circuit paths. A circuit path for example comprises a P-type transistor 214 and an N-type transistor 216 which are connected in series, and the connecting point is connected to the output point OUTN. The gates of the two transistors are respectively controlled by a control signal "a" and a control signal "b". Another circuit path also comprises a P-type transistor 218 and an N-type transistor 220 which are connected in series, and the connecting point is connected to the output point OUTP.

In addition, the two current sources 222, 224 are used to generate a pre-increased pre-emphasis current $I_N$ stacked on the current $I_M$ of the data signal. There is a load 212 between the output terminal OUTP and the output terminal OUTN, and the generated current Iout passes through the load 212 to generate the needed level of the data signal.

The descriptions of the control circuit and the pre-emphasis signal generating mechanism are described below. An original data signal DATA and an operation clock CLK are input to a delay circuit 250 first. Each signal cycle of the data signal has a level representing a bit data. The data signal on time axis represents the input of a data string. The change of a previous bit data and the change of the next bit data may be 10, 01, 00 or 11 such four cases. The data delay circuit 250 is mainly to delay a data signal to allow the data of previous cycle to compare with the data of current cycle, so as to know what state the change of data level is in. Basically there are three states: changing from low level (0) to high level (1), changing from high level (1) to low level (0), and level not changed. The case of level not changed may also be the case of maintaining in high level (11) or maintaining in low level (00). Therefore the states may also be further classified into four states: 01, 10, 11 and 00.

With the above mechanism, corresponding to the original data signal DATA, the delay circuit 250 generates the data signal A and the data invert signal AN which is invert to the data signal A. In addition, after an appropriate delay, the delayed data signal B and the delayed data invert signal BN which is invert to the delayed data signal B are generated. In addition, based on the input signals A, B, AN, BN, the pulse generator 252 generates four control signals a, b, c, d which respectively control the four transistors 214, 216, 218, 220 to turn on and turn off. Since the output terminal of the secondary stage LVDS transmitting circuit 160 is connected to the primary stage LVDS transmitting circuit 150, the pre-emphasis current $I_N$ generated by the secondary stage LVDS transmitting circuit 160 is stacked to the current $I_M$. The secondary stage LVDS transmitting circuit 160 is controlled to be in disabled state when the secondary stage LVDS transmitting circuit 160 doesn't need to generate the pre-emphasis current $I_N$.

The delay circuit 250 and the circuit of the pulse generator 252 may have a plurality of variations, examples are given below. FIG. 5 schematically illustrates a diagram of the delay circuit 250 according to an embodiment of the present invention. With reference to FIG. 5, the delay circuit 250 of the present invention for example comprises two flip-flops. The former stage flip-flop 250a receives the original data signal DATA and the clock signal CLK. Controlled by the clock signal CLK, the signal A and the invert signal AN are generated. The latter stage flip-flop 250b receives the signal A and the clock CLK, and outputs the signal B and the invert signal BN. In other words, the signal B is the delayed signal of the signal A, and the amount of delay is enough as long as the signal B and the signal A can be compared correctly to obtain the change state. The above delay circuit 250 is not limited to be implemented with flip-flop, for example the above delay circuit 250 may also be implemented with inverter.

According to an embodiment of the present invention, to control the secondary stage LVDS transmitting circuit, so that the secondary stage LVDS transmitting circuit is activated when the pre-emphasis signal is needed, and is deactivated when no pre-emphasis signal is needed, therefore some control signals are needed. With the circuit in FIG. 4, four control signals a, b, c, d, which are also called logic signals, need to be generated to control the transistor switch of the secondary stage LVDS transmitting circuit 160.

The generated logic truth table and output Iout are listed below:

| A | B | AN | BN | a | b | c | d | OUTPUT |
|---|---|----|----|---|---|---|---|--------|
| 0 | 0 | 1  | 1  | 1 | 0 | 1 | 0 | $-I_M$ |
| 0 | 1 | 1  | 0  | 0 | 0 | 1 | 1 | $-I_M - I_N$ |
| 1 | 0 | 0  | 1  | 1 | 1 | 0 | 0 | $I_M + I_N$ |
| 1 | 1 | 0  | 0  | 1 | 0 | 1 | 0 | $I_M$ |

Wherein $-I_M$ represents data low level, $I_M$ represents data high level, $-I_M-I_N$ represents the pre-emphasized data low level, $I_M+I_N$ represents the pre-emphasized data high level. According to the arrangement of the present invention, when A=B, the data $I_M$ is only output from the primary stage LVDS transmitting circuit 150. Therefore the control signals a, b, c, d are needed to disable the secondary stage LVDS transmitting circuit 160 at an appropriate time. For example when A=B, then a=1, b=0. In FIG. 4, since the P-type transistor is turned off by the high level, the N-type transistor is turned off by the low level, the signals a and b turn the transistors 214 and 216 off. In addition, due to the symmetric relations of the transistors in FIG. 4, the P-type transistor and the N-type transistor may also be swapped without changing the operation mechanism thereof.

The pulse generator 252 needs to generate the above relations to generate the control signals of a, b, c, and d. FIG. 6 schematically illustrates a circuit diagram of the pulse generator according to an embodiment of the present invention. With reference to FIG. 6, the pulse generator 252 comprises two pulse circuits 254, 264. The pulse circuit 254 for example comprises two P-type transistors 258, 260, and two N-type transistors 256, 262. And the signals a and b are generated based on the signals A and B. The pulse circuits 264 for example are the same as the pulse circuits 254, however the signals c and d are generated based on the signals AN and BN.

However, FIG. 6 is not the only design to implement the pulse generator 252. FIG. 7 schematically illustrates a circuit diagram of another pulse generator according to an embodiment of the present invention. With reference to FIG. 7, two pulse circuits 254, 264 may also comprises two inverters 266, 268, an OR gate 270 and an AND gate 272. Moreover, the two pulse circuits 254, 264 may also be implemented with different circuits. Some embodiments are provided below to describe the time sequence relations between signals. FIG. 8 schematically illustrated a signal transmitting time sequence diagram and a truth table using the circuit in FIG. 4 according to an embodiment of the present embodiment. With reference to FIG. 8, the original data DATA, for example 010011010, is the data to be transmitted. The clock CLK is used to generate the data signal A and the delayed data signal B. In the present embodiment, the data cycle for example is a clock cycle. The positive or negative current $I_M$ is provided by the primary stage LVDS transmitting circuit 150. The positive or negative current $I_M$ is provided by the primary stage LVDS transmitting circuit 160. In data sequence of 00 and 11, the second data does not generate the current $I_N$, therefore at least the power consumption of the secondary stage LVDS transmitting circuit 160 can be saved.

FIG. 9 schematically illustrated a signal transmitting time sequence diagram using the circuit in FIG. 4 according to another embodiment of the present embodiment. With reference to FIG. 9, the content of the original data DATA for example is also 010011010, but clock cycle of the clock signal CLK for example is half of the signal cycle. Thus the time width of the pre-emphasis signal may also be shortened.

Incorporated into an appropriate control mechanism, the present invention may generate the pre-emphasis signal only when data changes. No pre-emphasis signal is generated when there is no data change.

It will be apparent to those skilled in the art that various modifications and variations can be made to the structure of the present invention without departing from the scope or spirit of the invention. In view of the foregoing, it is intend that the present invention cover modifications and variations of this invention provided they fall within the scope of the following claims and their equivalents.

What is claimed:

1. A low voltage differential signaling (LVDS) transmitter, receiving a data signal, a data invert signal and a plurality of logic signals, the differential signaling transmitter comprising:
   a first-stage differential signaling transmitting circuit, receiving the data signal and the data invert signal, comprising a first output terminal and a second output terminal;
   a second-stage differential signaling transmitting circuit, being controlled by the logic signals, and comprising a third output terminal and a fourth output terminal, respectively coupled to the first output terminal and the second output terminal, so as to generate a desired pre-emphasis signal; and
   a pulse generator, receiving the data signal, the data invert signal, a delayed data signal, and a delayed data invert signal and outputting the logic signals according to a pre-set logic rule.

2. The LVDS transmitter of claim 1, wherein when there is no level change in the data signal, the second-stage differential signaling transmitting circuit controlled by the logic signals is in disabled state.

3. The LVDS transmitter of claim 1, further comprising a delay circuit receiving an original data signal and a clock signal and delaying the original data signal to generate the data signal and the data invert signal of the data signal, and further delaying the data signal for a period of time to output the delayed data signal and the delayed data invert signal of the delayed data signal.

4. The LVDS transmitter of claim 3, wherein the delay circuit comprises a first flip-flop and a second flip-flop, the first flip-flop receiving the original data and the clock signal, outputting the data signal and the data invert signal; the second flip-flop receiving the data signal and the clock signal, outputting the delayed data signal and the delayed data invert signal.

5. The LVDS transmitter of claim 1, wherein the pulse generator comprises a first circuit and a second circuit, the first circuit receives the data signal and the delayed data signal to generate two of the logic signals; the second circuit receives the data invert signal and the delayed data invert signal to generate another two of the logic signals; wherein the first and second circuits have a same logic operation relation.

6. The LVDS transmitter of claim 1, wherein the second-stage differential signaling transmitting circuit is controlled through the logic signals, so as to generate a positive pre-emphasis signal and a negative pre-emphasis signal respectively provided to a high level data signal and a low level data signal.

7. The LVDS transmitter of claim 1, wherein the first-stage differential signaling transmitting circuit comprises a first P-type transistor, a first N-type transistor, a second P-type transistor and a second N-type transistor; the first P-type transistor and the first N-type transistor are connected in series to form a first path, and two gates thereof are connected to receive the data signals; the second P-type transistors and the second N-type transistors are connected in series to form a second path, and two gates thereof are connected to receive the data invert signal; and the first path and the second path are connected in parallel.

8. The LVDS transmitter of claim 1, wherein the second-stage differential signaling transmitting circuit comprises a first P-type transistor, a first N-type transistor, a second P-type transistor and a second N-type transistor, the first P-type transistor and the first N-type transistor are connected at the third output terminal in series and form a first path; the second P-type transistors and the second N-type transistors are connected at the fourth terminal in series and form a second path; the first path and the second path are connected in parallel, four gates of the four transistors are respectively controlled by the logic signals.

9. The LVDS transmitter of claim 8, wherein the first path and the second path are connected in parallel between two current sources.

10. The LVDS transmitter of claim 8, further comprising a circuit, checking the level change of the data signal, and disabling the second-stage differential signaling transmitting circuit if no level change being detected.

11. The LVDS transmitter of claim 8, wherein the data signal is represented by A, the data invert signal is represented by AN, a delayed data signal of the data signal A is represented by B, an invert signal of the delayed data signal B is represented by BN; a plurality of the logic signals comprising four logic signals represented by a, b, c, d, which are respectively connected to the gates of the first P-type transistor, the first N-type transistor, the second P-type transistor and the second N-type transistor; the negative current output is represented by −IM, the positive current output is represented by IM, the pre-emphasis negative output is represented by −IM−IN, the pre-emphasis positive output is represented by IM+IN; the current IN is provided by the second-stage differential signaling transmitting circuit; working with the inputs of the data signal A and the data invert signal AN to execute a truth table and to output as follows:

| A | B | AN | BN | a | b | c | d | OUTPUT |
|---|---|----|----|---|---|---|---|--------|
| 0 | 0 | 1  | 1  | 1 | 0 | 1 | 0 | −IM    |
| 0 | 1 | 1  | 0  | 0 | 0 | 1 | 1 | −IM − IN |
| 1 | 0 | 0  | 1  | 1 | 1 | 0 | 0 | IM + IN |
| 1 | 1 | 0  | 0  | 1 | 0 | 1 | 0 | IM.    |

12. The LVDS transmitter of claim 11, wherein the data signal A, the data invert signal AN, the delayed data signal B and the delayed invert signal BN are generated by a delay circuit after receiving an original data signal and a clock signal.

13. The LVDS transmitter of claim 12, wherein the four logic signals a, b, c, d are generated by a pulse generator according to the states of the data signal A, the data invert signal AN, the delayed data signal B and the delayed invert signal BN.

14. A low voltage differential signaling (LVDS) transmitter, for transmitting a data signal, the differential signaling transmitter comprising:
    a control signal generating circuit, receiving the data signal to check a level of the data signal being in an unchanged state; and determining whether a rising state or a falling state if a level change being detected, wherein three types of control signals are output respectively corresponding to the three states;
    a first-stage differential signaling transmitting circuit, receiving the data signal and the data invert signal, comprising a first output terminal and a second output terminal; and
    a second-stage differential signaling transmitting circuit, receiving the control of the four logic signals, and comprising a third output terminal and a fourth output terminal respectively coupled to the first output terminal and the second output terminal, generating a desired pre-emphasis signal correspondingly according to the three types of control signals; and the second-stage differential signaling transmitting circuit being controlled in a disabled state when being in the unchanged state.

15. The LVDS transmitter of claim 14, wherein the control signal generating circuit comprises a delay circuit, which delays the data signal first, then compares the same with the level of a current data to determine one of the three states, so as to control an operation state of the second-stage differential signaling transmitting circuit.

16. The LVDS transmitter of claim 14, wherein a pulse width of the pre-emphasis signal is a width of a cycle time of a clock, or a fraction thereof.

17. A LVDS transmitting method, for transmitting a data signal, comprising:
    providing a first-stage differential signaling transmitting circuit, generating a data signal;
    providing a second-stage differential signaling transmitting circuit, coupled to the first-stage differential signaling transmitting circuit to generate a pre-emphasis signal to a rising side and a falling side of the data signal; and
    providing a control signal generating circuit, generating a plurality of control signals to control the second-stage differential signaling transmitting circuit to generate the pre-emphasis signal, and the second-stage differential signaling transmitting circuit being controlled in a disabled state when a level of the data signal being unchanged.

* * * * *